(12) United States Patent
Tang et al.

(10) Patent No.: US 12,166,852 B2
(45) Date of Patent: Dec. 10, 2024

(54) SELF-CALIBRATING DEVICE AND METHOD FOR IN-PHASE AND QUADRATURE TIME SKEW AND CONJUGATION IN A COHERENT TRANSMITTER

(71) Applicants: Xuefeng Tang, Kanata (CA); Qiang Jin, Guangdong (CN); Wing Chau Ng, Ottawa (CA); Si Ouyang, Guangdong (CN); Zhuhong Zhang, Ottawa (CA)

(72) Inventors: Xuefeng Tang, Kanata (CA); Qiang Jin, Guangdong (CN); Wing Chau Ng, Ottawa (CA); Si Ouyang, Guangdong (CN); Zhuhong Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 45 days.

(21) Appl. No.: 17/869,350

(22) Filed: Jul. 20, 2022

(65) Prior Publication Data

US 2022/0368512 A1 Nov. 17, 2022

Related U.S. Application Data

(63) Continuation of application No. PCT/CN2020/102183, filed on Jul. 15, 2020.

(51) Int. Cl.
*H04B 10/516* (2013.01)
*H04L 7/00* (2006.01)

(52) U.S. Cl.
CPC ........ *H04L 7/0016* (2013.01); *H04B 10/516* (2013.01)

(58) Field of Classification Search
CPC .......................... H04B 10/505; H04B 10/5057
See application file for complete search history.

(56) References Cited

U.S. PATENT DOCUMENTS

| | | | |
|---|---|---|---|
| 9,184,834 B1 | 11/2015 | Zhang et al. | |
| 9,705,592 B1 | 7/2017 | Schmogrow et al. | |
| 10,038,498 B1* | 7/2018 | Fan | H04B 10/532 |
| 2015/0341121 A1 | 11/2015 | Yue et al. | |
| 2018/0367220 A1 | 12/2018 | Nomura et al. | |
| 2019/0326998 A1* | 10/2019 | Chen | H04L 27/2096 |

(Continued)

FOREIGN PATENT DOCUMENTS

| | | |
|---|---|---|
| CN | 103339882 A | 10/2013 |
| CN | 103563323 A | 2/2014 |
| CN | 103597791 A | 2/2014 |

(Continued)

*Primary Examiner* — Shi K Li

(57) ABSTRACT

Methods and devices for IQ time skew and conjugation compensation and calibration of a coherent transmitter or transceiver are described. A pilot tone is combined with a digital data signal such that relative powers of the pilot tone in each of two frequency bands of the transmitted data signal may be detected by a pilot tone detector and used to calculate the time skew between I and Q modulation channels of the transmitter. A transmitter DSP applies IQ time skew bias to the data signal to compensate for any calculated IQ time skew. The pilot tone detector also provides the transmitter DSP with the information necessary to detect phase conjugation of the optical signal, which can be corrected by inverting the polarity of the data signal or changing the phase bias point of the optical modulator.

20 Claims, 10 Drawing Sheets

(56) References Cited

U.S. PATENT DOCUMENTS

2020/0092000 A1 3/2020 Xu et al.
2021/0243376 A1* 8/2021 Yoshino ............... H04N 23/667

FOREIGN PATENT DOCUMENTS

| CN | 103620989 A | 3/2014 |
|----|-------------|--------|
| CN | 106411415 A | 2/2017 |
| CN | 107453771 A | 12/2017 |
| WO | 2015154962 A1 | 10/2015 |

* cited by examiner

SELF-CALIBRATING DEVICE AND METHOD FOR IN-PHASE AND QUADRATURE TIME SKEW AND CONJUGATION IN A COHERENT TRANSMITTER

CROSS-REFERENCE TO RELATED APPLICATIONS

The present disclosure is a continuation application of International Application No. PCT/CN2020/102183, entitled "SELF-CALIBRATING DEVICE AND METHOD FOR IN-PHASE AND QUADRATURE TIME SKEW AND CONJUGATION IN A COHERENT TRANSMITTER", filed Jul. 15, 2020, the entirety of which is hereby incorporated by reference.

FIELD

The present disclosure is related to methods and devices for optical transmission, and in particular to methods and devices for compensating for IQ time skew in a coherent transmitter and identification of transmitter IQ phase conjugation.

BACKGROUND

Coherent optical transmitters (also called coherent transmitters) are used to transmit optical signals by modulating the amplitude and phase of light transmitted through an optical channel, such as a fiber optic cable. For example, data may be encoded using quadrature amplitude modulation (QAM), and the transmission capacity may be doubled using polarization multiplexing (PM). One technique for coherent transmission involves using two separate electrical data channels—an in-phase (I) data channel and a quadrature (Q) data channel—to modulate the I and Q phase modulation components of the optical signal using an electro-optical modulator (EOM), such as a Mach-Zehnder Modulator (MZM). In a polarization-multiplexing IQ modulator, I and Q channels may be used to modulate signals in each of two polarizations: an I channel for a horizontally (X-direction) polarized signal labelled XI, an I channel for a vertically (Y-direction) polarized signal labelled YI, a Q channel for the X-direction polarized signal labelled XQ, and a Q channel for the Y-direction polarized signal labelled YQ. (It will be appreciated that X need not be horizontal and Y need not be vertical, as long as X and Y are mutually orthogonal or substantially so.)

Time skew between the I and Q data channels of a coherent transmitter (called IQ time skew or simply IQ skew) is an impairment that may degrade the performance of the coherent transmitter, especially for high-order modulation formats at high baud rates, resulting in signaling error at the receiver. Some optical receivers may include digital signal processors (DSP), also called DSP units, that implement IQ equalization algorithms to compensate for IQ skew to some extent. However, receiver-side compensation performance may be degraded by channel impairments such as polarization mode dispersion (PMD), polarization dependent loss (PDL), and amplified spontaneous emission (ASE) noise. The signaling error from IQ time skew may cause signal-to-noise ratio (SNR) degradation that cannot be compensated for by a conventional 2×2 multiple-in and multiple-out (MIMO) equalizer in the receiver's DSP. Moreover, an IQ skew value of larger than half baud, i.e. 0.5 unit intervals (0.5 U.I.), may cause acquisition failure by the receiver DSP because the signaling error may be beyond the capacity of the 2×2 MIMO equalizer. Furthermore, receiver-side DSP compensation for IQ skew may increase the implementation complexity of the receiver application-specific integrated circuit (ASIC) and the chip power consumption. Therefore, performing accurate calibration and compensation of the IQ skew at the transmitter side may present advantages over receiver-side IQ time skew compensation.

IQ skew in a coherent transmitter may also be compensated for via a one-time factory calibration of the transmitter. The gross IQ skew is estimated from length difference of the printed circuit board (PCB) wires between the I and Q data channels, which may achieve a precision at the scale of pico-seconds. Fine skew, at a precision of better than 1.0 picoseconds, may be obtained by manually adjusting the skew value until an optimally smallest bit error rate (BER) reading is obtained from the receiver DSP. However, such manual IQ skew calibration is relatively inefficient, and the calibration value obtained in the factory calibration may not be accurate due to a number of factors: receiver equalizer convergence status, component aging effects, changing operating environment, and so on. Therefore, a transmitter capable of self-calibration at a transmitter power-up stage may present further advantages.

Transmitter IQ conjugation (also called phase conjugation, or simply conjugation) is a further impairment of optical communication that may cause acquisition failure at the receiver DSP due to IQ flipping. It is difficult to identify IQ conjugation at the transmitter side because of the large number of factors that may cause transmitter conjugation. Therefore, a simple and reliable technique to identify and/or compensate for conjugation at the transmitter side may present advantages.

SUMMARY

In various embodiments described herein, methods and devices are disclosed that provide self-calibration of in-phase and quadrature (IQ) time skew and conjugation in a coherent transmitter. Various embodiments may enable an optical transmitter to combine a pilot tone with each of two frequency bands of the digital data signal used to modulate the optical signal. The optical signal output of the transmitter is monitored by a pilot tone detector component of the transmitter, which detects the power of each pilot tone and calculates power ratios between the detected pilot tones of the two signal frequency bands. A DSP of the transmitter applies an IQ time skew bias value to the digital data signal; by sweeping the IQ time skew bias across a range of values, a linear interpolation may be constructed identifying an IQ time skew bias value at which the power ratio of the two detected pilot tones is 1:1, indicating a balance point at which the IQ time skew of the optical signal is equal to zero. The same linear interpolation, combined with phase bias information from the optical modulator, allows the transmitter to determine whether the optical signal is conjugated. Conjugation may be compensated for by either setting a bias point of the optical modulator or inverting the polarity of the digital data signal used to modulate the optical signal.

In some aspects, the present disclosure describes a device. The device has a pilot tone generator configured to combine a first pilot tone with a first frequency band of a digital data signal, and combine a second pilot tone with a second frequency band of the digital data signal, thereby generating a modified digital data signal. The device has an electro-optic modulator (EOM) configured to generate an optical signal based on the modified digital data signal. The device has a pilot tone detector configured to receive the optical signal, generate a detector digital signal based on the optical signal, and detect a first pilot tone power and a second pilot tone power based on the detector digital signal. The device has a control unit configured to determine an IQ time skew between an in-phase component and a quadrature component of the optical signal based on the first pilot tone power and second pilot tone power.

In some examples, the device further comprises a digital delay filter configured to receive the modified digital data signal, set an IQ time skew bias based on control information from the control unit, and apply the IQ time skew bias to the modified digital data signal. The control unit is further configured to generate the control information based on the IQ time skew, and provide the control information to the digital delay filter.

In some examples, the first frequency band is a portion of digital signal spectrum above a predetermined frequency, and the second frequency band is a portion of digital signal spectrum below the predetermined frequency.

In some examples, the control unit is further configured to perform IQ time-skew calibration by providing skew sweep control information to the digital delay filter such that the digital delay filter sets the IQ time-skew bias equal to each of a plurality of IQ time-skew bias values; for each of the plurality of IQ time-skew bias values, calculating a power ratio between the first pilot tone power and second pilot tone power for the respective IQ time-skew bias value; calculating the IQ time skew based on the plurality of IQ time-skew bias values and the respective plurality of power ratios; and providing IQ skew calibration control information to the digital delay filter such that the digital delay filter sets the IQ skew bias to compensate for the IQ time skew.

In some examples, the control unit is further configured to perform conjugation calibration by determining a phase conjugation status of the optical signal based on the plurality of IQ time-skew bias values and the respective plurality of power ratios and phase bias information received from the EOM, and compensating for the phase conjugation status by setting a bias point of the EOM or inverting a polarity of the modified digital data signal.

In some examples, the control unit is further configured to perform IQ time-skew calibration and conjugation calibration during a power-up phase of the device.

In some examples, calculating the IQ time skew based on the plurality of IQ time-skew bias values and the respective plurality of power ratios comprises calculating a linear interpolation of the plurality of IQ time-skew bias values and the respective plurality of power ratios; identifying a balance point on the linear interpolation corresponding to a power ratio value of 1:1; and setting the IQ time skew equal to an IQ time skew bias value corresponding to the balance point.

In some examples, determining a phase conjugation status of the optical signal comprises calculating a linear interpolation of the plurality of IQ time-skew bias values and the respective plurality of power ratios; identifying a positive or negative sign of a slope of the linear interpolation; and determining that the optical signal is conjugated based on the sign of the slope of the linear interpolation and the phase bias information.

In some examples, the first pilot tone has a modulation frequency that is different from a modulation frequency of the second pilot tone, and the pilot tone generator is configured to modulate the power of the first frequency band with the first pilot tone while modulating the power of the second frequency band with the second pilot tone.

In some examples, the first pilot tone and second pilot tone are both a single pilot tone having a single pilot tone modulation frequency. The pilot tone generator is configured to alternate over time between modulating the power of the first frequency band with the single pilot tone, and modulating the power of the second frequency band with the single pilot tone.

In some examples, the pilot tone generator combines the first pilot tone with the first frequency band of the digital data signal and combines the second pilot tone with the second frequency band of the digital data signal by applying a fast Fourier transform to the digital data signal to generate a frequency-domain digital data signal; applying a digital signal processing unit to the frequency-domain digital data signal to generate a frequency-domain first frequency band signal and a frequency-domain second frequency band signal; applying an inverse fast Fourier transform to the frequency-domain first frequency band signal and the frequency-domain second frequency band signal to generate a time-domain first frequency band signal and a time-domain second frequency band signal; modulating the amplitude of the time-domain first frequency band signal using the first pilot tone to generate a modified time-domain first frequency band signal; modulating the amplitude of the time-domain second frequency band signal using the second pilot tone to generate a modified time-domain second frequency band signal; and combining the modified time-domain first frequency band signal and modified time-domain second frequency band signal to generate the modified digital data signal.

In some examples, modulating the amplitude of the time-domain first frequency band signal and modulating the amplitude of the time-domain second frequency band signal is performed using a modulation index between 1% and 3%.

In some examples, the first pilot tone and second pilot tone each have a respective modulation frequency between 100 kHz and 100 MHz.

In some examples, the electro-optic modulator comprises a dual-polarization IQ Mach-Zehnder modulator.

In some aspects, the present disclosure describes a device. The device has a pilot tone detector configured to receive an optical signal, generate a detector digital signal based on the optical signal, and detect a first pilot tone power and a second pilot tone power based on the detector digital signal. The device has a control unit configured to determine an IQ time skew between an in-phase component and a quadrature component of the optical signal based on the first pilot tone power and second pilot tone power.

In some examples, the pilot tone detector comprises a low-speed photodetector for receiving the optical signal and generating a detector analog signal based on the optical signal, an analog-to-digital converter (ADC) for generating the detector digital signal based on the detector analog signal, and a pilot tone detector digital signal processing (DSP) unit for detecting the first pilot tone power and second pilot tone power and determining the IQ time skew.

In some aspects, the present disclosure describes a method. A first pilot tone is combined with a first frequency band of a digital data signal, and a second pilot tone is combined with a second frequency band of the digital data signal, thereby generating a modified digital data signal. An optical signal is generated based on the modified digital data signal. A detector digital signal is generated based on the optical signal. A first pilot tone power and a second pilot tone power are detected based on the detector digital signal. The first pilot tone power and second pilot tone power are used to determine an IQ time skew between an in-phase component and a quadrature component of the optical signal.

In some examples, the method further comprises performing IQ time-skew calibration by setting an IQ time-skew bias equal to each of a plurality of IQ time-skew bias values; for each of the plurality of IQ time-skew bias values, applying the IQ time-skew bias to the digital data signal and calculating a power ratio between the first pilot tone power and second pilot tone power for the respective IQ time-skew bias value; calculating the IQ time skew based on the plurality of IQ time-skew bias values and the respective plurality of power ratios; and applying the IQ time skew bias to the digital data signal to compensate for the IQ time skew.

In some examples, the method further comprises performing conjugation calibration by determining a phase conjugation status of the optical signal based on the plurality of IQ time-skew bias values and the respective plurality of power ratios and phase bias information of an optical modulator used to generate the optical signal, and compensating for the phase conjugation status by setting a bias point of the optical modulator or inverting a polarity of the modified digital data signal.

In some examples, IQ time-skew calibration and conjugation detection are performed during a power-up phase.

As used herein, a "modulation component" of a signal may refer to any characteristic of a signal that may be modulated to encode data, e.g., amplitude, frequency, and phase. As used herein, however, unless otherwise specified, the term "modulation component" refers specifically to either an in-phase (I) component or a quadrature (Q) component of a quadrature amplitude modulated (QAM) signal. In the case of a polarization-multiplexed signal (i.e. a first QAM signal at a first polarization direction and a second QAM signal at a second, typically orthogonal, polarization direction), a modulation component may refer to the I or Q component of one of the QAM signals.

As any of the above-noted modulation components of an optical signal may encode data from a data channel at the transmitter and may be decoded to yield a data channel at a receiver, a modulation component may occasionally be referred to herein as a "channel" or "modulation channel" of the optical signal. As a QAM signal consists of two phase orthogonal data channels (corresponding to the I and Q modulation components), a polarization-multiplexing quadrature-phase modulator generates a signal having four modulation channels: a first modulation component in a first polarization direction (e.g. an I modulation component in a horizontal X polarization direction), a second modulation component in the first polarization direction (e.g. a Q modulation component in the X polarization direction), a first modulation component in a second polarization direction (e.g. an I modulation component in a vertical Y polarization direction), and a second modulation component in a second polarization direction (e.g. a Q modulation component in the vertical Y polarization direction). Each of these channels may encode data independently of the other three channels. Furthermore, the various modulation components may occasionally be referred to herein by a shortened form thereof. An in-phase (real) phase modulation component may be referred to herein as an "in-phase modulation component", an "in-phase component", an "I modulation component", an "I component", or sometimes simply "I". It will be appreciated that the capital letters Q and I as used herein refer to the respective modulation components of a signal, the corresponding data channels used to modulate said signal components, or the corresponding data channels decoded or demodulated from said signal components.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In examples disclosed herein, methods and apparatuses are described that provide self-calibration of in-phase and quadrature (IQ) time skew and conjugation in a coherent transmitter.

As noted above, one technique for coherent transmission involves using an in-phase (I) data channel and a quadrature (Q) data channel to modulate the I and Q phase modulation components of the optical signal using an electro-optical modulator (EOM), such as an in-phase and quadrature (IQ) Mach-Zehnder Modulator (IQ-MZM). An example of IQ time skew will now be described with reference to an example IQ-MZM using I and Q data channels to modulate the I and Q components of the optical signal.

Figure 1A:
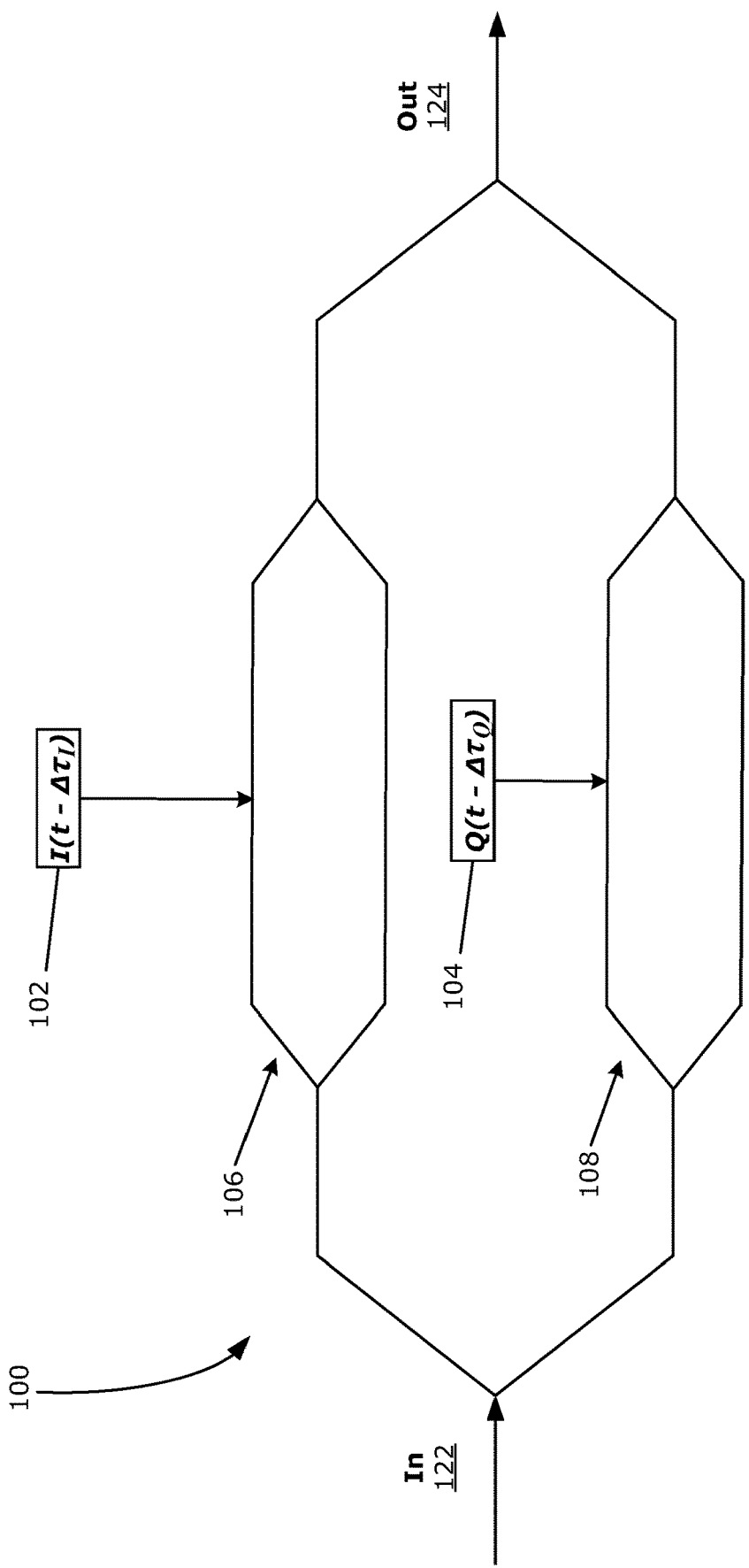
FIG. 1A is a schematic of an in-phase and quadrature Mach-Zehnder modulator (IQ-MZM), in accordance with examples described herein.

FIG. 1A is a schematic illustrating the channel paths of an electro-optical modulator (EOM) 100, shown here as a IQ Mach-Zehnder Modulator (IQ-MZM) having an in-phase (I) channel path 106 modulated by an analog electrical in-phase (I) data channel 102 and a quadrature (Q) channel path 108 modulated by an analog electrical quadrature (Q) data channel 104. The present described embodiments are not limited to an IQ-MZM but may use any optical modulator suitable to carry out IQ modulation.

The EOM 100 receives an optical input 122 in the form of a laser providing a light source at a particular frequency (single wavelength). The optical input 122 is split into the I channel path 106 and Q channel path 108 in accordance with optical interferometry techniques. The I path 106 receives an analog electrical signal from an I channel 102, which modulates an I component of the optical signal propagated through the I channel path 106. The Q path 108 receives an analog electrical signal from a Q channel 104, which modulates a Q component of the optical signal propagated through the Q channel path 108. The optical signal output of the I path 106 and the optical signal output of the Q path 108 are coupled or combined to form a phase modulated optical signal 124 at the output of the EOM 100.

The IQ skew is a relative delay between the data path of the I channel 102 and the data path of the Q channel 104, which is defined as $$\Delta \tau_{IQ} = \Delta \tau_Q - \Delta \tau_I \qquad (1)$$

wherein $\Delta \tau_{IQ}$ is the time skew, $\Delta \tau_Q$ is the time delay of the I data path, and $\Delta \tau_I$ is the time delay of the Q data path. The IQ skew is caused by a physical time delay difference between the I channel 102 and Q channel 104. The time delay in these channels 102, 104 may be caused by a combination of transmitter components: e.g., a digital-to-analog converter (DAC) used to generate the analog channels from digital inputs, a driver used to drive the EOM 100, the EOM 100 itself, and/or the printed circuit board (PCB) wires used by the transmitter.

As noted above, the present described embodiments may use any optical modulator suitable to carry out IQ modulation. A second technique for coherent transmission involves using four separate electrical data channels to modulate four modulation components of the optical signal: the four orthogonal signals carried on the four channels are the XI, XQ, YI, and YQ signals described above, modulating the I and Q components of each of two polarization directions (X and Y) of the optical signal. This technique may be referred to as polarization-multiplexing optical modulation.

Figure 1B:
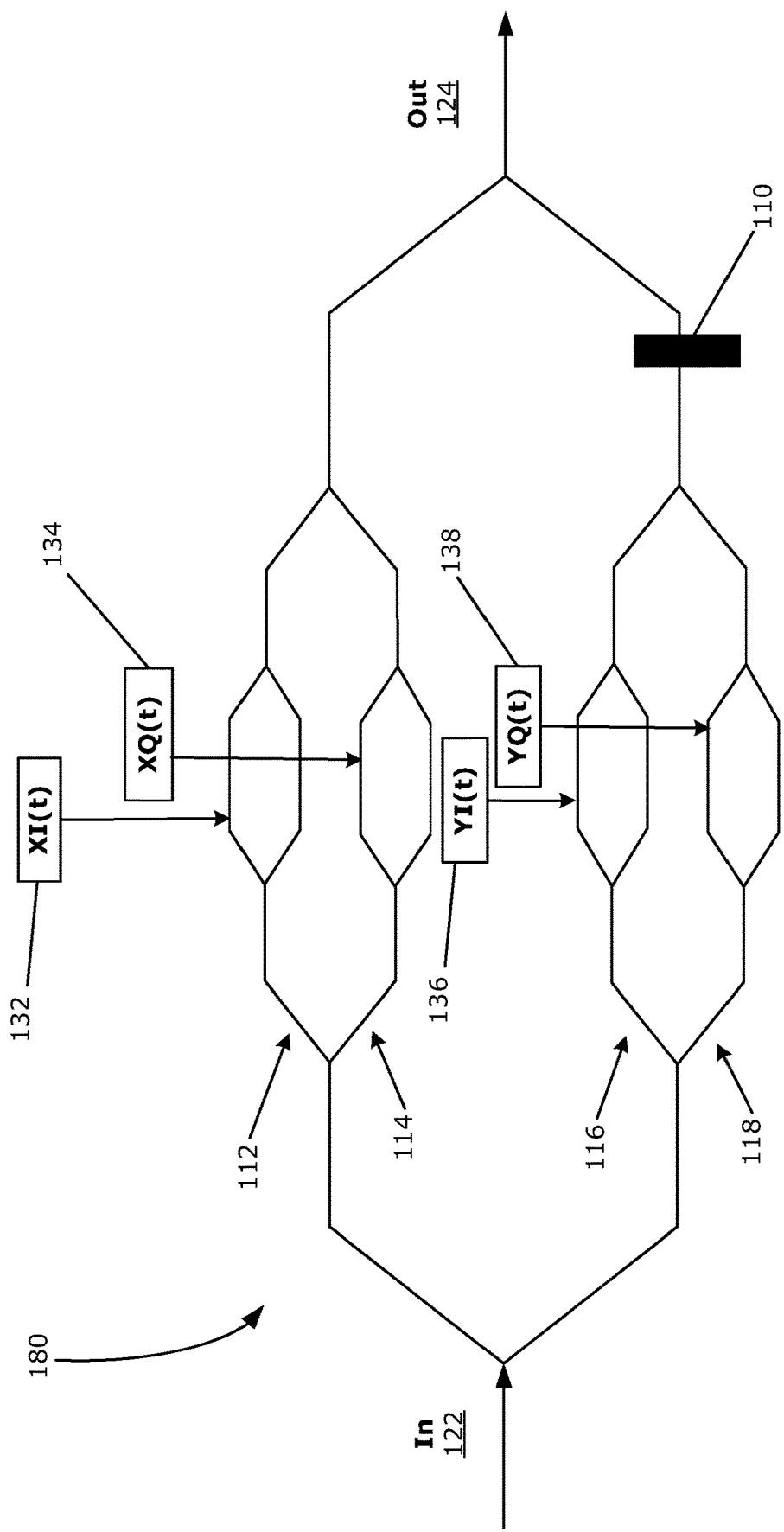
FIG. 1B is a schematic of a polarization-multiplexing IQ Mach-Zehnder Modulator (PM-IQMZM), in accordance with examples described herein.

FIG. 1B is a schematic illustrating the channel paths of a second example EOM in the form of a dual-polarization IQ Mach-Zehnder Modulator (DP-IQMZM) 180, having four channel paths 112, 114, 116, 118, each channel path being modulated by an analog electrical data channel input 132, 134, 136, 138.

In the DP-IQMZM 180, the optical input 122 is split into two channel paths, each of which is split into a further two channel paths. This yields four channel paths: an XI path 112, an XQ path 114, a YI path 116, and a YQ path 118. The XI path 112 receives an analog electrical signal from an XI channel 132, which modulates an I component of the signal propagated through the XI channel path 112 to form an XI modulated signal with X polarization. Each of the other three paths is similarly modulated by an analog electrical signal: the XQ path 114 by XQ channel 134 to form an XQ modulated signal with X polarization; the YI path 116 by YI channel 136 to form a YI modulated signal with Y polarization, and the YQ path 118 by YQ channel 138 to form a YQ modulated signal with Y polarization. The optical signal outputs of the XI path 112 and XQ path 114 are coupled or combined to form a modulated complex signal (XI+j*XQ) with X polarization, and the optical signal outputs of the YI path 116 and YQ path 118 are coupled or combined and fed through a polarization rotator 110 to form a modulated complex signal (YI+j*YQ) with Y polarization, thereby enabling polarization multiplexing. The X-polarized signal and Y-polarized signal are coupled or combined to form a polarization-multiplexed optical signal 124 at the output of the DP-IQMZM 180. The four orthogonal data channels XI 132, XQ 134, YI 136, and YQ 138 are analog electrical data channels of an amplified analog electrical data signal used to drive the PM-IQMZM 180.

Figure 2A:
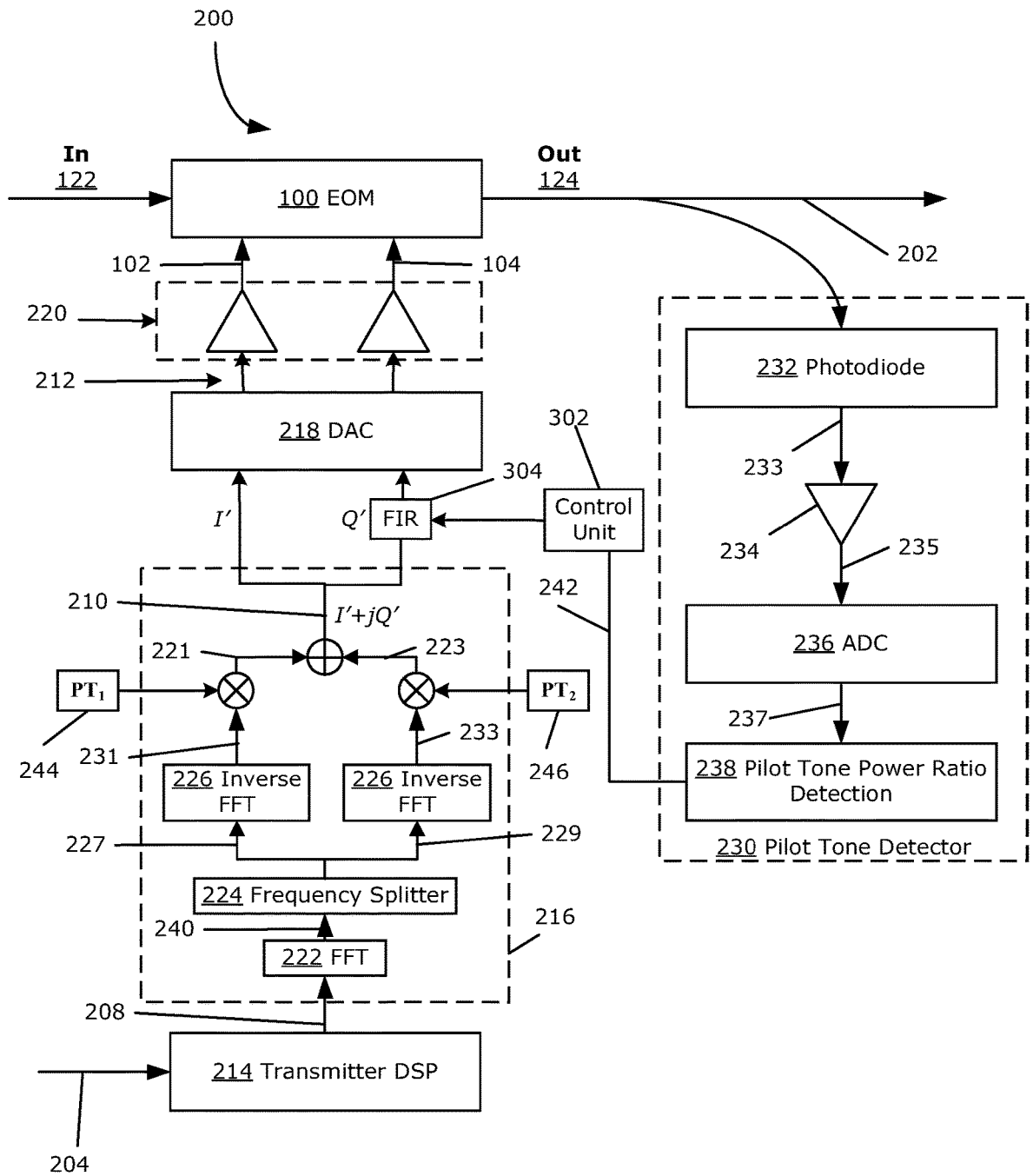
FIG. 2A is a block diagram of a coherent transmitter device with IQ skew and conjugation compensation, in accordance with examples described herein.

FIG. 2A is a block diagram of a coherent transmitter device 200 with IQ skew detection and compensation. The device 200 uses an EOM 100, such as the IQ-MZM of FIG. 1A, to modulate an optical signal 124 for transmission across an optical communication link 202. The optical signal 124 encodes one or more pilot tones generated by a pilot tone generator 216 and combined with the digital data signal. The optical signal 124 modulated by the EOM 100 is also propagated to a pilot tone detector 230, which detects power ratios between the pilot tones present in the optical signal 124 and uses these power ratios to calculate transmission IQ time skew. It will be appreciated that the power of a signal, or a component of a signal (such as an amplitude-modulated pilot tone), is equal to the square of the amplitude of that signal or signal component. Therefore, any description of power herein may be understood to equivalently apply to amplitude as long as the mathematical relationship between amplitude and power is maintained. Thus, e.g., calculation of a power ratio between two signal components may be carried out as a calculation of a ratio of the square of the amplitude of each signal component.

In operation, a data signal is propagated through several stages of an optical transmitter before being used to modulate the optical signal 124 of the EOM 100. The data signal exists in different formats at different stages: digital, analog, time-domain, frequency-domain, and pre- and post-modification or alteration by the various stages of the transmitter. At each such stage, the data signal may be referred to as the "data signal"; at any analog stage it may be referred to as an "analog data signal"; at any digital stage it may be referred to as a "digital data signal"; at any time-domain stage it may be referred to as a "time-domain data signal"; and at any frequency-domain stage it may be referred to as a "frequency-domain data signal".

The data signal is first received by the device 200 as an input digital data signal 204. A transmitter DSP 214 generates a DSP digital data signal 208 based on the input digital data signal 204. The DSP 214 may apply digital signal processing operations unrelated to IQ time skew calibration to the input digital data signal 204 in order to generate the DSP digital data signal 208.

The DSP digital data signal 208 is received by a pilot tone generator 216, which combines one or more pilot tones with the DSP digital data signal 208 by modulating the amplitude of a frequency band of the DSP digital data signal 208 with a respective pilot tone 244,246. The operation of the pilot tone generator 216 will now be described in detail.

The pilot tone generator 216 first applies a Fourier transform operation, shown here as a fast Fourier transform (FFT) operation 222, to the DSP digital data signal 208 to transform the DSP digital data signal 208 into a frequency-domain digital data signal 240. A frequency splitter 224 (e.g., a further digital signal processing unit of the pilot tone generator 216) is used to split the frequency-domain digital data signal 240 into two frequency bands or spectrum bands to generate a frequency-domain first frequency band signal 227 and a frequency-domain second frequency band signal 229. The splitting operation performed by the frequency splitter 224 may in some embodiments generate a frequency-domain first frequency band signal 227 which occupies a frequency band that is higher in frequency relative to the band occupied by the frequency-domain second frequency band signal 229. In such embodiments, the frequency-domain first frequency band signal 227 may be referred to as an "upper spectrum band signal", whereas the frequency-domain second frequency band signal 229 may be referred to as a "lower spectrum band signal". It will be appreciated that the frequency-domain first frequency band signal 227 and the frequency-domain second frequency band signal 229 may be transformed back into the time domain at various stages or operations of the device 200; regardless of the domain in which these two signals are encoded, they may be referred to as a "first frequency band signal" and a "second frequency band signal", respectively.

Figure 2B:
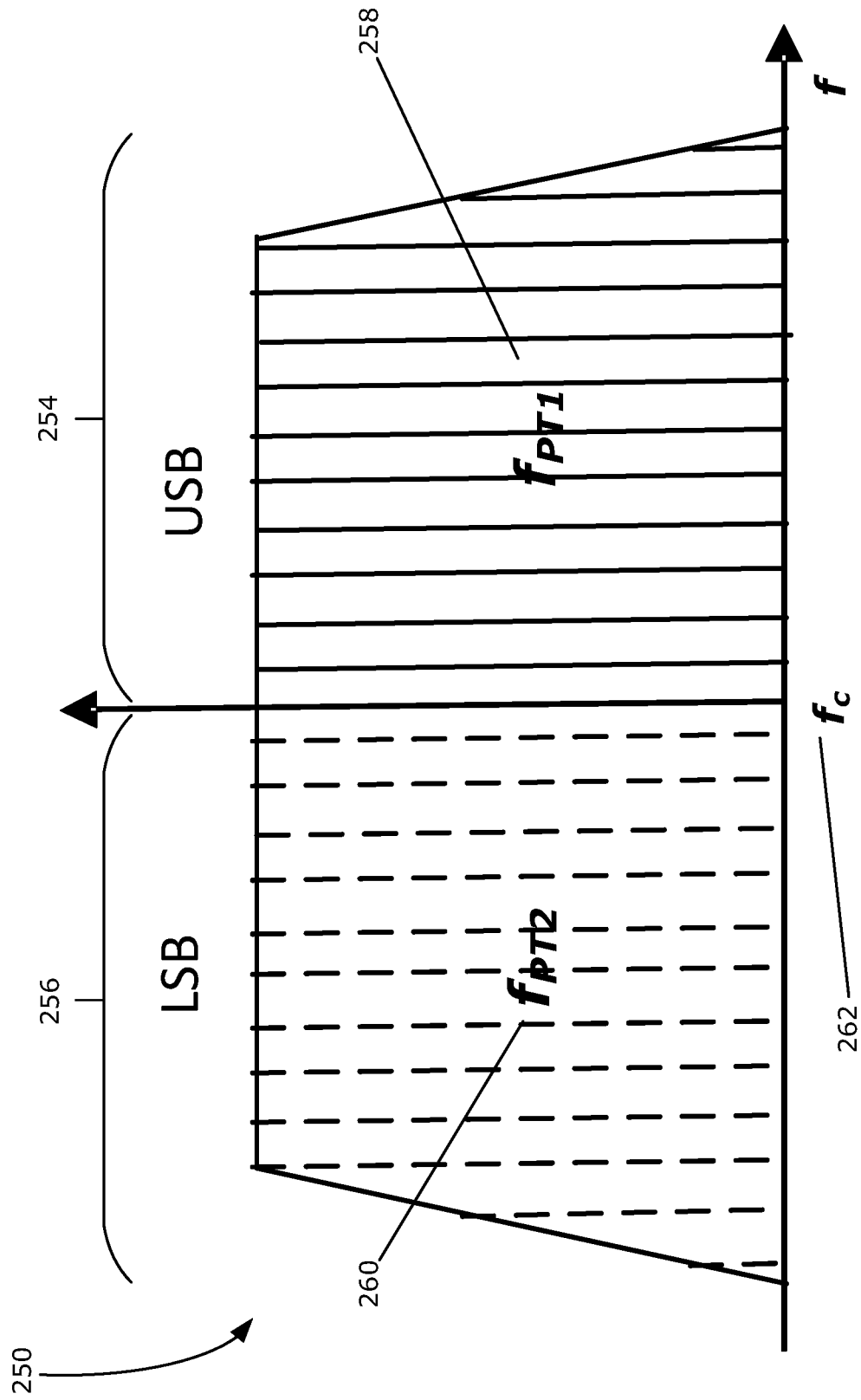
FIG. 2B is a schematic diagram showing frequency bands of a data signal with a pilot tones tone applied to each frequency band, in accordance with examples described herein.

FIG. 2B shows an example representation of the two frequency bands of a data signal in such an embodiment. A schematic 250 shows the upper spectrum band 254 and lower spectrum band 256 plotted along the frequency dimension (X axis). A center frequency fc 262 defines the upper bound of the lower frequency band 256 and the lower bound of the upper frequency band 254. The first pilot tone modulation frequency $f_{PT1}$ 258 modulates the upper frequency band 254, whereas the second pilot tone modulation frequency $f_{PT2}$ 260 modulates the lower frequency band 256 of the data signal.

In some embodiments, the frequency-domain first frequency band signal 227 and frequency-domain second frequency band signal 229 may be generated by applying the frequency splitter 224 to split the frequency-domain digital data signal 240 at a predetermined frequency. In some embodiments, the first frequency band occupied by the first frequency band signal is a portion of digital signal spectrum above the predetermined frequency, whereas the second frequency band occupied by the second frequency band signal is a portion of digital signal spectrum below the predetermined frequency. The predetermined frequency may be a zero frequency in some embodiments; in such embodiments, the first frequency band signal 227 may be referred to as a "positive frequency band signal", whereas the frequency-domain second frequency band signal 229 may be referred to as a "negative frequency band signal".

The frequency-domain first frequency band signal 227 and frequency-domain second frequency band signal 229 are each transformed back to the time domain by applying an inverse Fourier transform (shown as inverse fast Fourier transform operation 226) to the frequency-domain first frequency band signal 227 to generate a time-domain first frequency band signal 231 and to the frequency-domain second frequency band signal to generate a time-domain second frequency band signal 233.

A pilot tone is then combined with each of the two signals. A first pilot tone $PT_1$ 244 is used to modulate the amplitude of the time-domain first frequency band signal 231 to generate a modified time-domain first frequency band signal 221, and a second pilot tone $PT_2$ 246 is used to modulate the amplitude of the time-domain second frequency band signal 233 to generate a modified time-domain second frequency band signal 223. In some embodiments, the first pilot tone 244 has a different modulation frequency from that of the second pilot tone 246. In some such embodiments, both pilot tones 244, 246 may be applied simultaneously to modulate the amplitude of each of the two time-domain signals 231, 233. Other embodiments may use a single pilot tone having a single pilot tone modulation frequency as both the first pilot tone 244 and the second pilot tone 246. In some such embodiments, the pilot tone generator 216 may be configured to alternate over time between, during a first time period, modulating the amplitude of the first frequency band (i.e. the time-domain first frequency band signal 231) with the single pilot tone and, during a second time period, modulating the amplitude of the second frequency band (i.e. the time-domain second frequency band signal 233) with the single pilot tone. Such time-alternating embodiments may require synchronization of the pilot tone generator 216 with the sampling operations of the pilot tone detector 230 described below.

In some embodiments, the pilot tone modulation is performed using a modulation index between 1% and 3%, thereby creating only a minor perturbance of each signal being modulated. Embodiments using a lower modulation index (e.g., 1%) may require the use of a longer averaging window to detect the pilot tone than embodiments using a higher modulation index (e.g. 3%).

In some embodiments, each pilot tone has a low modulation frequency: some embodiments may use pilot tones having respective modulation frequencies in the range of KHz to MHz, and some embodiments may specifically use pilot tones having respective modulation frequencies between 100 kHz and 100 MHz.

In some embodiments, the first pilot tone $PT_1$ 244 is used to apply an amplitude modulation to the first frequency band digital signal 231, effectively multiplying the signal amplitude by $(1+m \times \cos(2\pi f_{PT1} t))$, wherein $f_{PT1}$ indicates the modulation frequency of the first pilot tone $PT_1$ 244 and m indicates the modulation index. The second pilot tone $PT_2$ 246 is used to apply an amplitude modulation to the second frequency band digital signal 233, effectively multiplying the signal amplitude by $(1+m \times \cos(2\pi f_{PT2} t))$ wherein $f_{PT2}$ indicates the modulation frequency of the second pilot tone $PT_2$ 246 and m indicates the modulation index. Whereas this example shows the pilot tones as sinusoidal signals, it will be appreciated that other signal forms may be used for the pilot tones, such as square waves.

The modified time-domain first frequency band signal 221 is combined with the modified time-domain second frequency band signal 223 (e.g., by a simple signal addition operation) to generate a modified digital data signal 210, which can be represented as a modified I component I' and a modified Q component Q' multiplied by j, i.e. I'+jQ', to form a complex signal. The Q' component passes through a digital delay filter 304, shown as a finite impulse response (FIR) filter, in order to apply any I/Q skew digitally to compensate for the physical IQ skew between the I and Q data path. It will be appreciated that the I' component of the modified digital data signal 210 may include XI' and YI' channels, and that the Q' component may include XQ' and YQ' channels, in embodiments using polarization multiplexing. In such embodiments, the digital delay filter 304 would apply time skew bias to the XQ' and YQ' channels.

The modified digital data signal 210 is transformed into an analog data signal, shown in FIG. 2A as a pair of analog data signal channels 212, by a digital-to-analog converter (DAC) 218. The analog data signal channels 212 are amplified by a set of amplifiers 220, thereby generating a pair of amplified data signal channels 102, 104 corresponding to the I channel 102 and Q channel 104 of FIG. 1A. It will be appreciated that the encoding of the data signal into I and Q channels could be performed by any of a number of components other than the DAC 218, at either a digital or analog stage.

The I channel 102 and Q channel 104 are used as inputs to the EOM 100 to modulate the optical input 122 to generate the optical signal 124, as described above with reference to FIG. 1A. The optical field of the optical signal 124 carrying the amplitude modulated pilot tones is described by the equation:

$$E(t)=E_0(t)+m\ \cos(2\pi f_{PT1}t)\cdot E_0^{USB}(t)+m\ \cos(2\pi f_{PT2}t)\cdot E_0^{LSB}(t) \quad (2)$$

wherein $f_{PT1,2}$ are the pilot-tone frequencies and m is the modulation index. The EOM 100 is thus used to generate the optical signal 124 based on the modified digital data signal 210. It will be appreciated that other embodiments may be used, such as embodiments using a polarization-multiplexing EOM such as the EOM shown in FIG. 1B. Such embodiments may use four orthogonal digital data channels to drive the EOM.

It will be appreciated that the data encoded in a given data signal or data channel may be equivalently encoded in the same signal or channel at a different stage (e.g., digital vs. analog, amplified vs. pre-amplified, optical vs. electrical). Statements herein regarding the modulation of a signal or channel by another signal or channel, or the detection of characteristics of a first signal or channel in a second signal or channel, may refer to either direct or indirect modulation or detection. For example, the DSP digital data signal 208 may be said to encode the input digital data signal 204, whereas the analog data channels 212 or the amplified analog data channels 102, 104 may be said to encode the modified digital data signal 210.

Returning to FIG. 2A, a pilot tone detector 230 receives the optical signal 124 at a photo detector, shown here as a low-speed photodiode 232. The photodiode 232 generates a pilot tone detector analog signal 233 based on the optical signal 124, which is provided to an amplifier 234 to generate an amplified pilot tone detector analog signal 235. The amplified pilot tone detector analog signal 235 is provided to an analog-to-digital converter (ADC) 236, which generates a pilot tone detector digital signal 237.

The pilot tone detector digital signal 237 is provided to a pilot tone amplitude ratio detection unit 238, which detects the first pilot tone 244 and second pilot tone 246 decoded from the optical signal 124, detects a first pilot tone amplitude and a second pilot tone amplitude, and calculates a power ratio between the amplitudes of the two pilot tones 244, 246. The ratio between the two detected pilot-tone amplitudes may be determined by the equation:

$$R = \frac{\langle |V_I(t)|^2\rangle + \langle |V_q(t)|^2\rangle + \sin\Delta\theta(\langle V_I(t)H_I(t-\Delta\tau-\Delta\tau_{IQ})\rangle + \langle V_q(t)H_q(t-\Delta\tau-\Delta\tau_{IQ})\rangle)}{\langle |V_I(t)|^2\rangle + \langle |V_q(t)|^2\rangle - \sin\Delta\theta(\langle V_I(t)H_I(t-\Delta\tau-\Delta\tau_{IQ})\rangle + \langle V_q(t)H_q(t-\Delta\tau-\Delta\tau_{IQ})\rangle)} \quad (3)$$

wherein $V_{I,q}$ are the in-phase and quadrature fields of the optical signal 124, respectively, and $H_{I,q}$ is the corresponding Hilbert transform. $\Delta\theta$ is the quadrature phase deviation from 90 degrees (i.e., the quadrature error), $\Delta\tau$ is a delay applied by the digital delay filter 304, and $\Delta\tau_{IQ}$ is the physical delay between the I channel 102 and Q channel 104. The cross-correlation between the received signal and its Hilbert transform has a strong dependence on the timing skew between the I channel 102 and Q channel 104. The cross-correlation value thus equals zero only if the skew between V and H is canceled, as shown in the transfer function calculated for a 65 Gbaud non-return to zero (NRZ) signal in FIG. 3.

Figure 3:
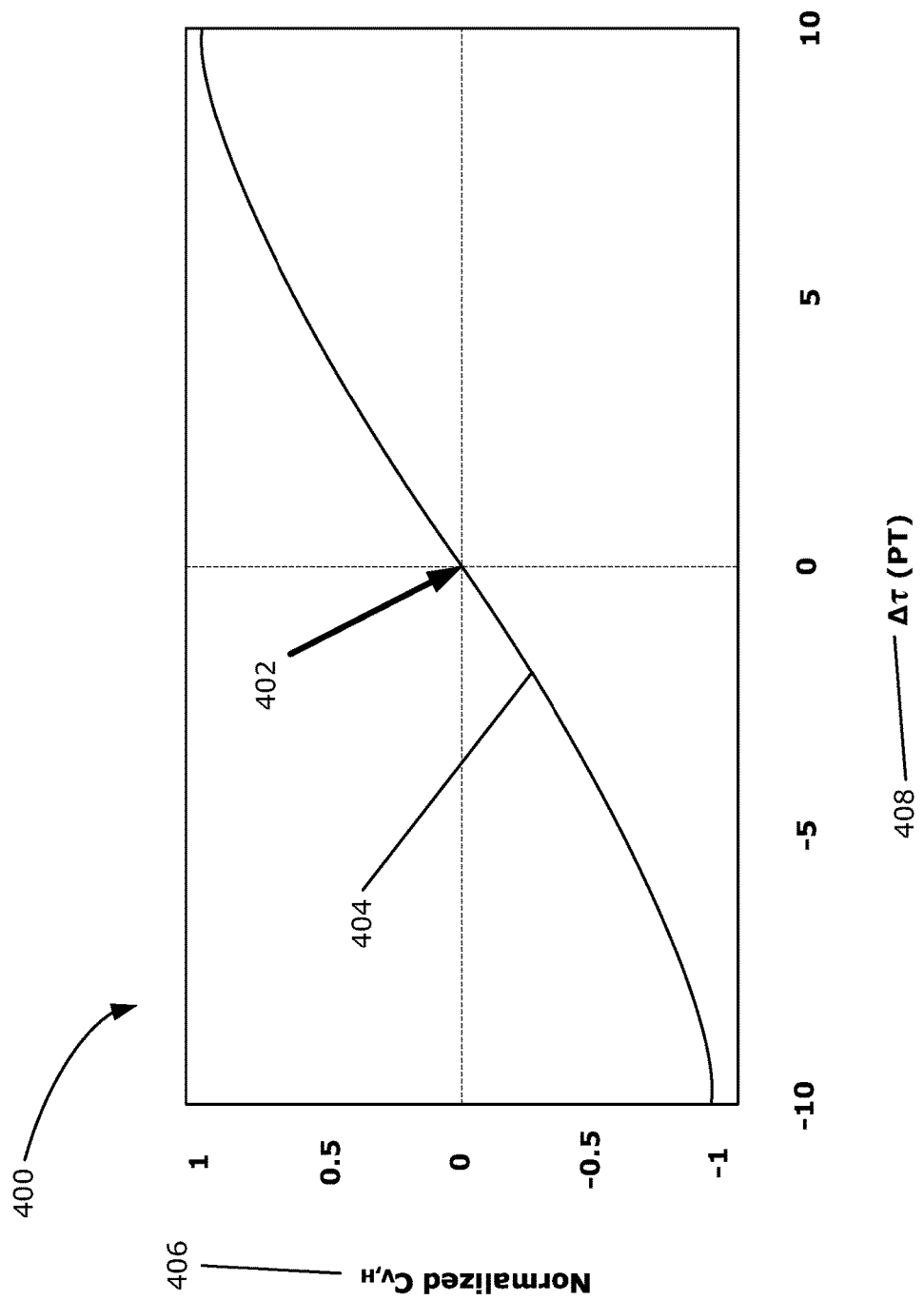
FIG. 3 is a transfer function 400 for a Quadrature Phase Shift Keying (QPSK) optical signal showing the relationship between the cross-correlation between the signal and its Hilbert transform (on the Y axis) and the IQ time skew of the signal (on the X axis).

FIG. 3 shows a transfer function 400 for a 65 Gbaud quadrature-phase-shifted-keying (QPSK) optical signal 124. The normalized $C_{V,H}$ cross-correlation value between the signal and its Hilbert transform is mapped on the Y axis 406. The IQ time skew of the signal is mapped on the X axis 408. The curve 404 showing the relationship between these two properties has a zero point 402 at which the cross-correlation value is zero only if the IQ time skew is zero.

Thus, the device 200 applies an amplitude modulated pilot-tone to the data channels, and the power ratios between the in-phase and quadrature data channels can be accurately measured by the pilot-tone detector 216 to determine IQ time skew. The pilot tone power can be extracted from the power spectrum density obtained by performing a Fourier transform (e.g., a fast Fourier transform) of the pilot tone detector digital signal 237 with a digital signal processor (DSP) of the pilot tone power ratio detection unit 238. In some embodiments, the pilot tone power in each channel is monitored by the pilot tone detector 230 tapping a small portion of power to the pilot tone detector 230. The pilot tone detector 230 may measure the power of each pilot tone at a single frequency to cancel any measurement error caused by a receiver frequency response ripple.

In some embodiments, the pilot tone detector 230 may be relatively low-cost. The pilot tone detector 230 may consist of a low-speed photodetector such as low-speed photodiode 232, an analog-to-digital convertor 236, and a pilot tone detector digital signal processor (DSP) implementing the pilot tone power ratio detection unit 238.

IQ time skew calibration is carried out by the device 200 based on feedback from the pilot tone power ratio detection unit 238. The digital delay filter 304 is used to apply an IQ time skew bias to the DSP digital data signal 208 (shown in FIG. 2A as a FIR filter applying time skew bias to the Q' component of the modified digital data signal 210), thereby biasing the IQ time skew of the data signal to potentially correct for IQ time skew introduced by various operations in the data path of the I channel 102 and/or Q channel 104. The amount of IQ time skew bias applied to the data signal by the digital delay filter 304 is determined by control information (e.g., control signals) received from a control unit 302. In some embodiments, the control unit 302 may be a processor or controller configured to perform calculations, make decisions, and store and retrieve data in registers or a memory in order to carry out the various methods and operations described herein.

The control unit 302 is configured to determine an IQ time skew between the in-phase component and quadrature component of the optical signal 124 based on the first pilot tone power and second pilot tone power as determined by the pilot tone power ratio detection unit 238. After the pilot tone power ratio detection unit 238 calculates the power ratio between the two detected pilot tones, power ratio information 242 is passed from the pilot tone power ratio detection unit 238 to the control unit 302. The control unit 302 uses the power ratio information 242 to determine the IQ skew of the optical signal 124, as described in greater detail below. The control unit 302 may then send control information to the digital delay filter 304 to apply an amount of IQ time skew bias to the DSP digital data signal 208 based on the calculated IQ time skew of the optical signal 124.

In the context of IQ time skew calibration or compensation, the input digital data signal 204 may be considered a non-biased digital data signal, and the digital delay filter 304 is configured to receive the non-biased digital data signal (i.e. input digital data signal 204), set an IQ time skew bias based on control information from the control unit 302, and generate the digital data signal by applying the IQ time skew bias to the non-biased digital data signal. The control unit 302 is configured to calculate the IQ time skew as described above, generate the control information based on the calculated IQ time skew, and provide the control information to the digital delay filter 304.

In some embodiments, an IQ detection and calibration step is carried out during a power-up phase of the device 200, or otherwise outside of a service mode of the device 200 in which the device 200 is actively transmitting data to a receiver. The IQ detection and calibration step may involve identifying the IQ time skew of the optical signal 124 and applying compensatory IQ time skew bias using the digital delay filter 304. In some embodiments, IQ skew detection and/or calibration could be performed during the service mode, i.e. in real time during data transmission, provided a small amount of offset is applied to the phase bias point of the EOM 100.

In order to accurately determine the IQ time skew of the optical signal 124 and potentially compensate therefor, the device may include additional components to carry out IQ skew detection and calibration. These components are described below as components or operations of the transmitter DSP 214, but in some embodiments they may be included in the device 200 somewhere other than the transmitter DSP 214.

Figure 4:
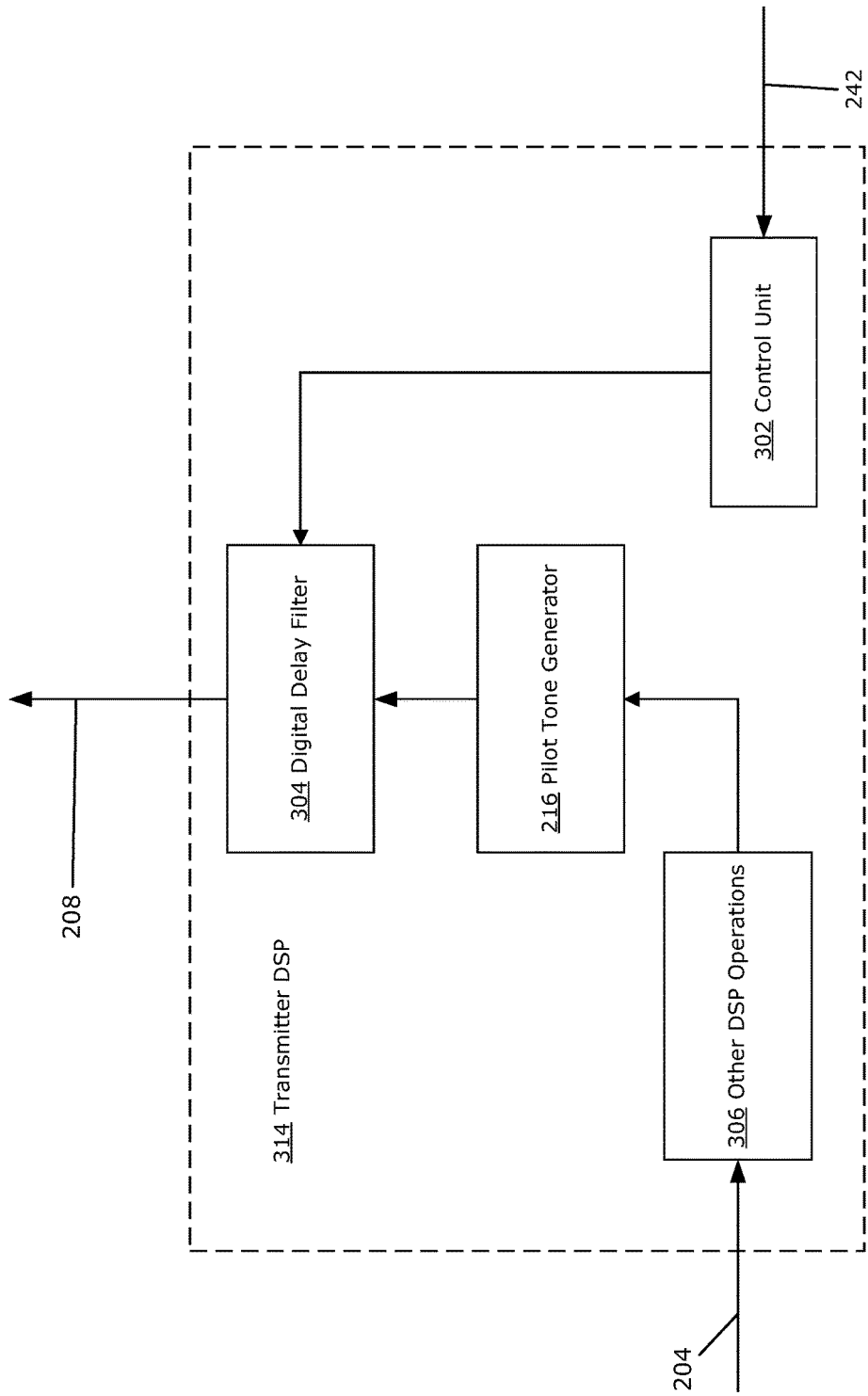
FIG. 4 is a block diagram of an alternative embodiment of a transmitter DSP including a pilot tone generator and digital delay filter, in accordance with examples described herein.
Figure 5:
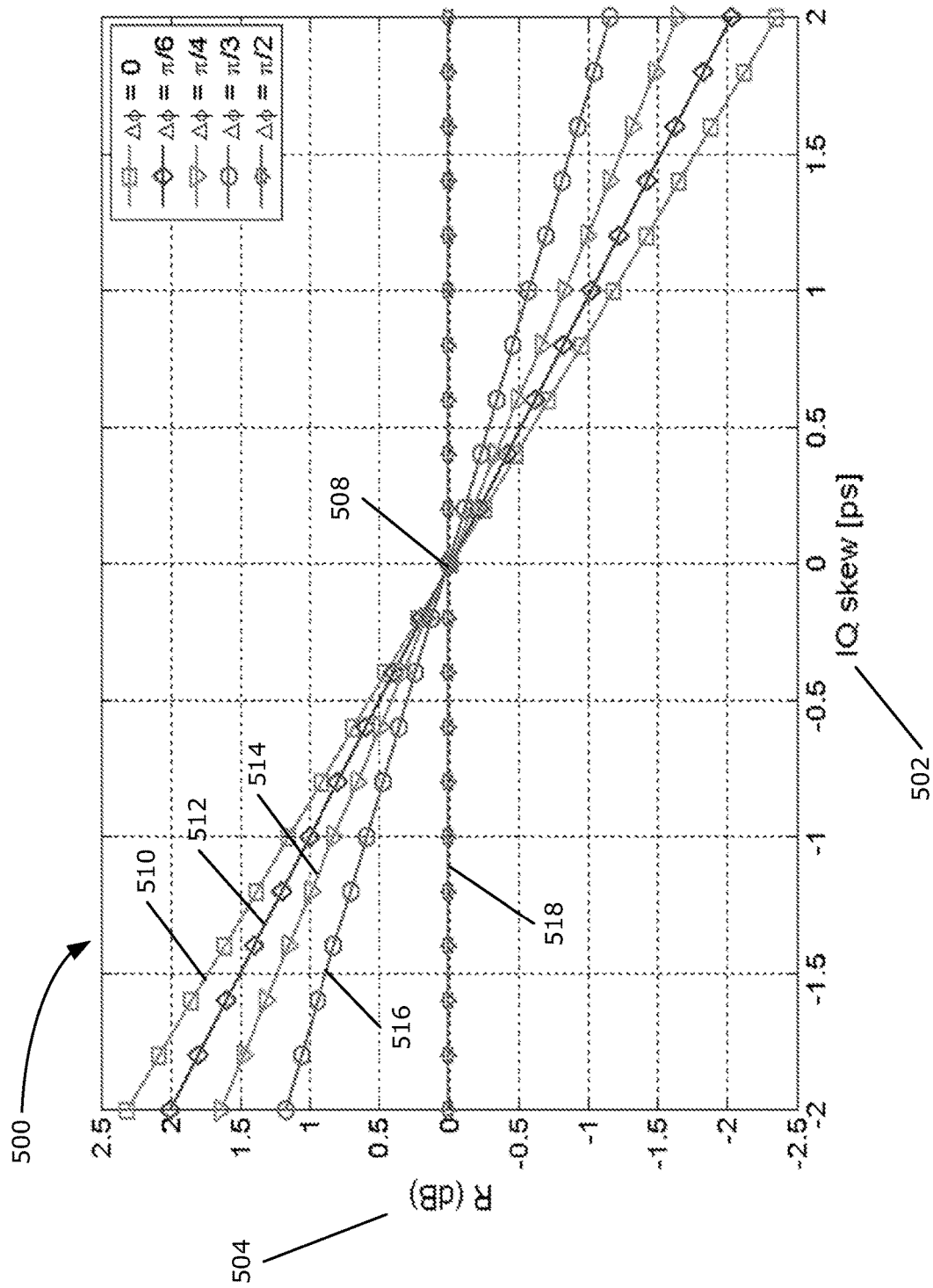
FIG. 5 is a plot of simulation results for detecting pilot tone power ratio as a function of the IQ time skew of an optical signal at different phase bias points, in accordance with examples described herein.

FIG. 4 shows a block diagram of an alternative embodiment of a transmitter DSP 314, wherein the pilot tone generator 216, control unit 302, and digital delay filter 304 are considered to be components of the DSP 314. The transmitter DSP 314 includes the digital delay filter 304, control unit 302, and digital delay filter 304 in addition to a conventional set of DSP components that perform other DSP operations 306. It will be appreciated that the other DSP operations 306 may correspond in some embodiments to the operations carried out by the transmitter DSP 214 of FIG. 2A. The input digital data signal 204 is received by the components performing the other DSP operations 306, which are performed prior to the pilot tone generation and digital delay to correct for IQ time skew. FIG. 5 is a plot of simulation results 500 for detecting the pilot tone amplitude ratio as a function of the IQ time skew of the optical signal at different phase bias points. The IQ time skew 502 (in picosends) is plotted on the X axis, and the pilot tone amplitude ratio R 504 (in decibels) as detected by the pilot tone detector 230 is plotted on the Y axis. The pilot tone amplitude ratio 504 for five different phase bias points (set by, e.g., the transmitter DSP 214) is plotted against the IQ time skew 502 as the IQ time skew is varied by sweeping the IQ time skew bias value of the digital delay filter 304 across a range of values from −2 picoseconds to 2 picoseconds. The five different phase bias points shown in the plot 500 are: $\Delta\phi=0$ (510), $\Delta\phi=\pi/6$ (512), $\Delta\phi=\pi/4$ (514), $\Delta\phi=\pi/3$ (516), and $\Delta\phi=\pi/2$ (518).

As expected from equation (2) above, the pilot tone power ratio 504 has no dependence on the IQ time skew 502 when the phase is biased at $\pi/2$ (518). By applying a phase bias of $\Delta\phi=0$ (510), a strong dependence of R 504 on the IQ skew 502 detuning can be observed. For all plotted phase bias points 510, 512, 514, 516, 518, the pilot tone power imbalance (i.e. power ratio between the two pilot tones is not equal to 1:1 or 0 dB) is canceled only when the IQ skew 502 is zero, at balance point 508. As shown in the simulation results 500, for a phase bias at $\Delta\phi=\pi/4$ (514), the skew measurement sensitivity of the pilot tone detector 230 may be better than 0.2 picoseconds, or 0.1 dB accuracy for pilot tone power ratio 504 measurement. In some embodiments, the measurement sensitivity increases with the signal baud rate.

An example method will now be described for performing an IQ skew detection and calibration step using the device 200 or another coherent transmitter having pilot tone generation and detection capabilities.

Figure 6:
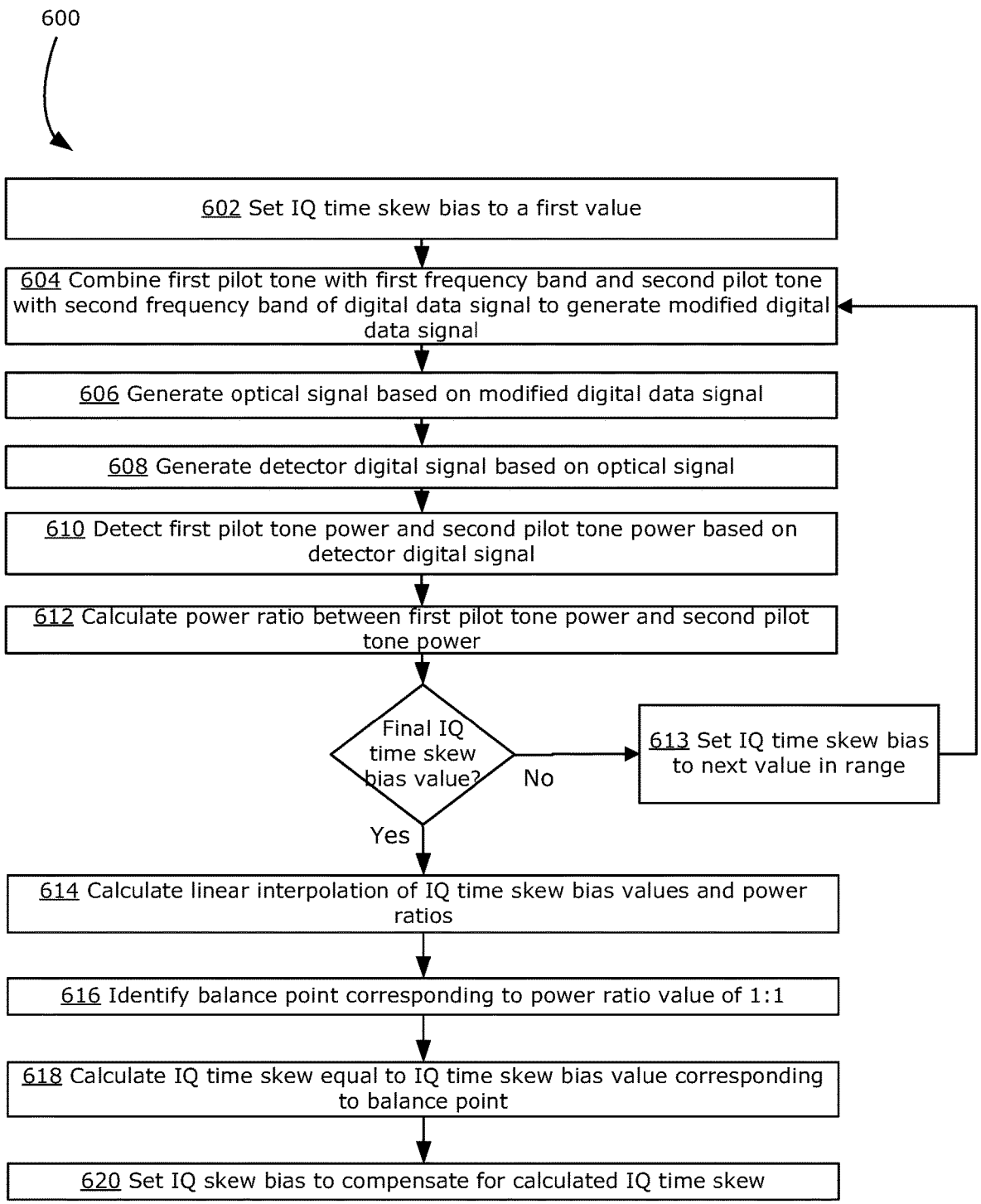
FIG. 6 is a flowchart showing an example method for performing IQ skew detection and calibration in a coherent transmitter, in accordance with examples described herein.

FIG. 6 is a flowchart showing an example method 600 for performing IQ skew detection and calibration in a coherent transmitter in accordance with device 200 described above. The method 600 operates by sweeping the IQ time-skew bias of the digital delay filter 304 across a range of values and recording the power ratios of the detected pilot tones at each bias value, then plotting a linear interpolation of the ratios to determine the IQ skew bias point for calibration of IQ time skew. The control unit 302 provides skew sweep control information to the digital delay filter 304 such that the digital delay filter 304 is instructed to set the IQ time-skew bias equal to each of a plurality of IQ time-skew bias values. The skew sweep control information may comprise instructions or control signals causing the digital delay filter 304 to set the IQ time skew bias value to a predetermined number of values between a minimum value and a maximum value defining an IQ time skew bias range. In some embodiments, the minimum value and a maximum value of the IQ time skew bias range may be −2 picoseconds and 2 picoseconds, respectively, as in the plot of FIG. 5. In some embodiments, the predetermined number of IQ time skew bias values is 21, as in the plot of FIG. 5. It will be appreciated that different embodiments may vary any of these values; a wider IQ time skew bias range and a larger predetermined number of IQ time skew bias values may yield greater accuracy, range and resolution in calculating the IQ time skew of the optical signal 124. The sweeping range and predetermined number of values can also be represented as a sweeping range and step size.

First, at 602, a first such IQ time skew bias value of the digital delay filter 304 is set in response to skew sweep control information provided by the control unit 302. In some embodiments, as phase bias offset of the EOM 100 may also be set at this step 602.

For each of the plurality of IQ time-skew bias values, steps 604 through 612 are performed.

At step 604, the pilot tone generator 216 is used to combine the first pilot tone 244 with a first frequency band of the digital data signal (e.g., time-domain first frequency band signal 231) and combine the second pilot tone 246 with a second frequency band of the digital data signal (e.g., time-domain second frequency band signal 233), thereby generating a modified digital data signal (e.g., modified digital data signal 210). In device 200, the modified digital data signal 210 is generated by adding together the modified time-domain first frequency band signal 221 and modified time-domain second frequency band signal 223. It will be appreciated that the pilot tone generation and combination with the data signal takes place continuously and therefore simultaneously with other steps of the method 600 in some embodiments.

At 606, the optical signal 124 is generated by the electro-optical modulator 100 based on the modified digital data signal 210. In device 200, the EOM 100 is directly modulated by the I channel 102 and Q channel 104, which are amplified versions of the analog data channels 212, which are in turn analog encodings of the modified digital data signal 210.

At 608, the detector digital signal 237 is generated based on the optical signal 124. In device 200, the detector digital signal 237 is a digital encoding of the amplified pilot tone detector analog signal 235, which is an amplified version of the pilot tone detector analog signal 233, which is an electrical encoding of the optical signal 124 received by the photodiode 232.

At 610, the pilot tone power ratio detection unit 238 is used to detect a first pilot tone power and a second pilot tone power based on the detector digital signal 237, as described in detail above.

At 612, the pilot tone power ratio detection unit 238 calculates a power ratio between the first pilot tone power and second pilot tone power for the respective IQ time-skew bias value set by the digital delay filter 304. In device 200, the pilot tone power ratio detection unit 238 calculates an power ratio between the first pilot tone power and second pilot tone power, thereby generating power ratio information 242, which is passed to the control unit 302.

Steps 604 through 612 are repeated for each IQ time skew bias value set by the digital delay filter 304 in its sweep. If a further bias value remains within the range, the IQ time skew bias value of the digital delay filter 304 is set to the next value in the range at step 613, and the method 600 returns to step 604.

Once the IQ time skew bias value sweep has been completed, the control unit 302 uses the power ratio information 242 to determine an IQ time skew between an in-phase component and a quadrature component of the optical signal 124, as described above. The IQ time skew is calculated based on the plurality of IQ time-skew bias values and the respective plurality of power ratios received from the pilot tone power ratio detection unit 238 as power ratio information 242. In device 200, the control unit 302 may store the plurality of power ratio information 242 transmissions, e.g., in registers or a memory for calculation of the IQ time skew once the sweep is complete. The IQ time skew calculation is performed by the control unit 302 in steps 614 through 618 described below.

At 614, the control unit 302 calculates a linear interpolation of the plurality of IQ time-skew bias values and the respective plurality of power ratios. The linear interpolation may be calculated or represented in any manner or format that preserves the information defining the linear interpolation, i.e. slope and the position of at least one point on the line of the linear interpolation. Examples of linear interpolations of plotted points on a graph of power ratio R against IQ time skew are shown as the linear interpolations 510, 512, 514, 516, and 518 in FIG. 5. Whereas the example liner interpolations in FIG. 5 are able to be plotted as a line passing through each data point, in some embodiments inaccuracies in measurement may require the linear interpolation to be plotted using, e.g., a least-mean-squares linear regression to fit the data points. It will be appreciated that a linear interpolation or approximation or estimation thereof may be generated using any of a number of mathematical techniques.

At 616, the control unit 302 identifies a balance point on the linear interpolation corresponding to a power ratio value of 1:1 (i.e. 0 dB). In the example linear interpolations of FIG. 5, the balance point is balance point 508.

At 618, the control unit calculates the IQ time skew as equal to an IQ time skew bias value corresponding to the balance point 508, i.e., the IQ time skew is calculated to be the X value of a point on the linear interpolation corresponding to a hypothetical IQ time skew bias value that corresponds to a power ratio of 1:1 (i.e. 0 dB). The x-axis location of the balance point 508 provides this value for the IQ time skew of the optical signal 124.

At 620, the control unit 302 provides IQ skew calibration control information to the digital delay filter 304 such that the digital delay filter 304 sets the IQ skew bias to compensate for the calculated IQ time skew. The control information 242 at this step 620 comprises IQ skew calibration control information, and this step 620 may be referred to as the step of calibrating the device 200 to compensate for IQ time skew.

In some embodiments the above-described method 600 may calibrate a time skew with a precision (or accuracy) of better than 0.1 picosecond using a low-speed pilot detector 230 and detector ADC 236.

In some embodiments, the device 200 may be further configured to perform phase conjugation detection and/or calibration. Phase conjugation (also referred to herein as IQ conjugation or transmitter IQ conjugation) may be caused by a number of factors, including transmitter hardware layouts, digital to analog channel mappings, and/or bias operating points for each EOM. Therefore, it may be difficult to detect conjugation using only a single parameter. Transmitter IQ conjugation may cause a number of problems: for example, it may cause the incorrect (i.e. opposite) sign to be used for chromatic dispersion applied in the transmitter DSP, and/or it may cause acquisition failure at the receiver DSP due to IQ flipping. Therefore, the identification and/or correction of transmitter conjugation may present advantages.

Figure 7A:
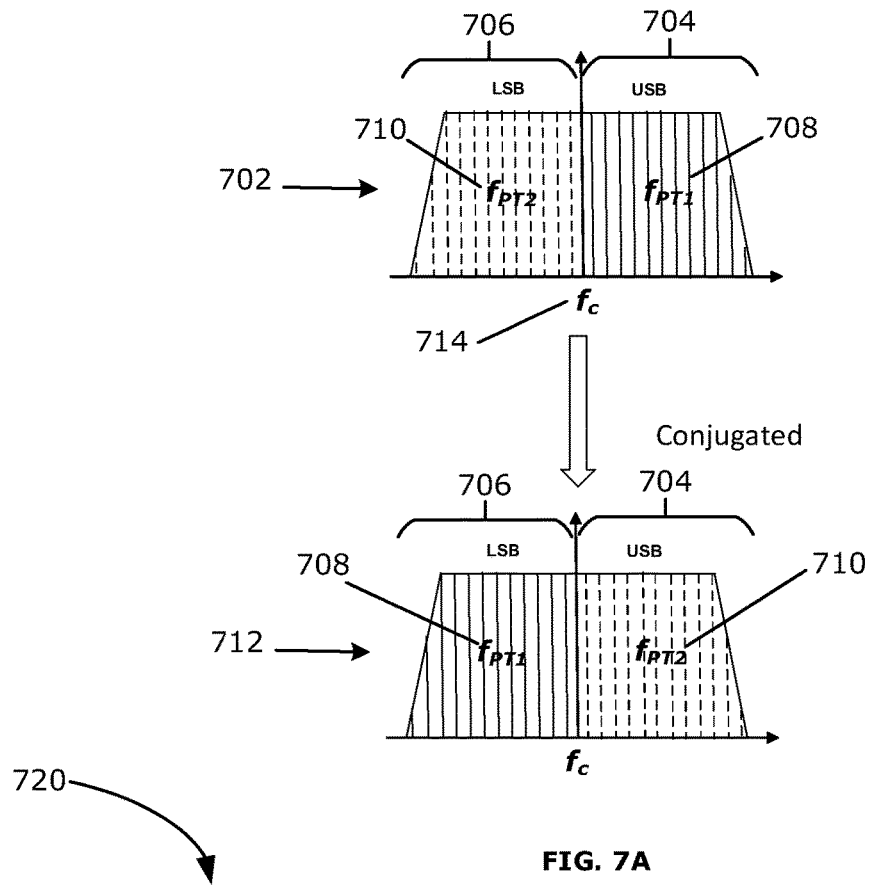
FIG. 7A is a schematic diagram showing transmitter conjugation causing a frequency band swap for two pilot tones applied in the digital domain.

FIG. 7A shows transmitter conjugation causing a frequency band swap for two pilot tones applied in the digital domain. In the non-conjugated optical signal 702, the first pilot tone modulation frequency $f_{PT1}$ 708 modulates the first frequency band of the data signal (shown as upper spectrum band 704), and the second pilot tone modulation frequency $f_{PT2}$ 710 modulates the second frequency band of the data signal (shown as lower spectrum band 706). For an optical signal spectrum, the predetermined frequency (the frequency to which the two frequency bands references to) is the center frequency 714 of the light source (also called the carrier frequency). In the conjugated optical signal 712, the upper and lower frequency bands are swapped as compared the unconjugated one; the first pilot tone modulation frequency $f_{PT1}$ 708 instead modulates the lower spectrum band 706, and the second pilot tone modulation frequency $f_{PT2}$ 710 modulates the upper spectrum band 704. As shown in equation (3) above, the slope of the pilot tone power ratio versus IQ skew tuning is determined at a given sign of the quadrature phase offset. The phase offset may be determined in some embodiments by the voltage offset from the bias point at $\pi/2$ and the slope sign of the EOM 100 power transfer function: it is at positive or negative slope of the power transfer function. The bias point information may be acquired in some embodiments during a bias control initialization stage of the EOM 100.

Figure 7B:
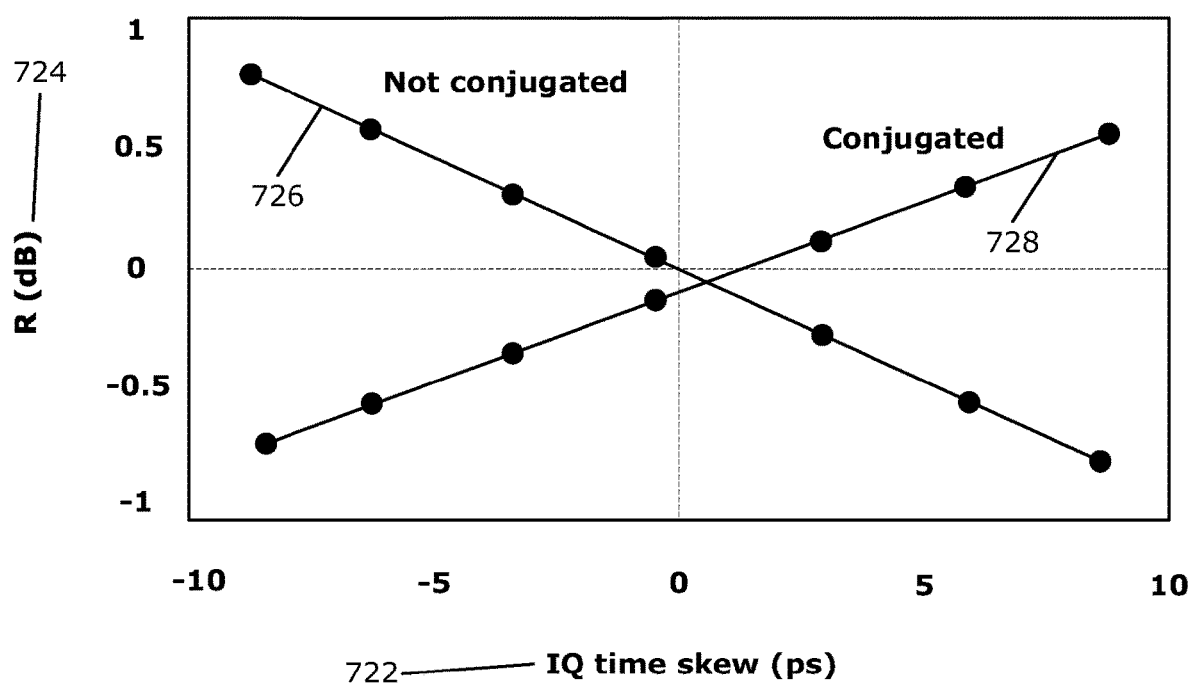
FIG. 7B is a plot of data points captured for a non-conjugated signal and a conjugated signal and linear interpolations thereof, showing pilot tone power ratio as a function of the IQ time skew, in accordance with examples described herein.

FIG. 7B shows a plot 720 of data points captured for a non-conjugated signal 726 and a conjugated signal 728. The data points are plotted with IQ time skew 722, applied by the digital delay filter 304 as the X axis and the detected pilot tone power ratio R 724 as the Y axis, as in FIG. 5. It can be observed that the slope of the linear regression of the data points for the non-conjugated signal 726 is negative, whereas the slope of the linear regression of the data points for the conjugated signal 728 is positive and approximately the inverse of the negative slope of the linear regression of the data points for the non-conjugated signal 726.

Figure 8:
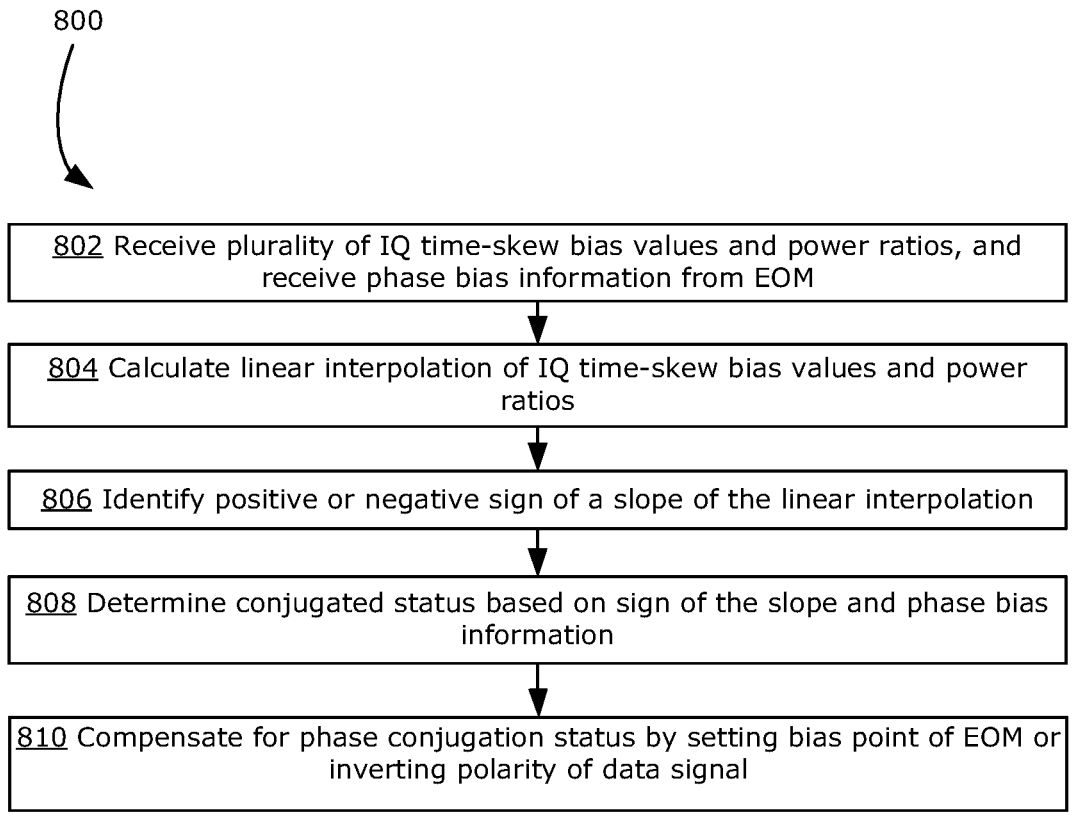
FIG. 8 is a flowchart showing an example method for detecting and calibrating conjugation of a coherent transmitter, in accordance with examples described herein.

FIG. 8 is a flowchart showing an example method 800 for detecting and calibrating conjugation of a coherent transmitter. In some embodiments, the transmitter phase conjugation calibration method 800 may be performed at a start-up phase of the transmitter, such as device 200. The steps of the example method 800 will be described with reference to device 200.

Method 800 may be carried out in some embodiments using the same IQ skew and pilot tone power ratio data gathered and calculated using the steps of IQ skew method 600. The steps of method 800 described below assume that method 600 is being carried out concurrently or in addition to the steps of method 800. In particular, method 800 relies on the data generated and calculated by steps 602 through 614 of method 600.

At 802, the control unit 302 receives the plurality of IQ time-skew bias values and the respective plurality of power ratios from steps 602 and 612 of method 600, and receives phase bias information from the EOM 100. In some embodiments, the EOM 100 may provide the control unit 302 with access to and control over a phase bias setting of the EOM 100.

At steps 804 through 808, the control unit calculates the phase conjugation status of the optical signal 124 (i.e., whether the optical signal 124 is conjugated or not) based on the plurality of IQ time-skew bias values, the respective plurality of power ratios, and the phase bias information.

At step 804, the control unit calculates a linear interpolation of the plurality of IQ time-skew bias values and the respective plurality of power ratios. This step 804 may be omitted if the corresponding step 614 of method 600 is performed.

At step 806, the control unit 302 identifies a positive or negative sign of a slope of the linear interpolation. This determination may be explicit or implicit: for example, in some embodiments steps 804 and 806 may be carried out by simply determining the relative R and IQ time skew values of two data points and determining whether they indicate a positive or negative trend line.

At step 808, the control unit 302 determines that the optical signal 124 is conjugated based on the sign of the slope of the linear interpolation and the phase bias information. For example, in a linear interpolation such as those of FIG. 7B, a negative slope may indicate a negative conjugation status, whereas a positive slope may indicate a positive conjugation status.

At step 810, the transmitter compensates for the phase conjugation status. This may be accomplished in various embodiments by, e.g., setting a bias point of the EOM 100, or inverting a polarity of the modified digital data signal 210. In some embodiments, the data signal may have its polarity inverted at a different stage. The bias point of the EOM 100 may be set by the control unit 302, as described above. Typically, a negative conjugation status may be compensated for by doing nothing, whereas a positive status may be compensated for by setting a bias point of the EOM 100 or inverting the polarity of the data signal. In some embodiments, the control unit 302 may be further configured to control one or more components of the device 200 to invert the polarity of either the I' or Q' digital data channel of modified digital data signal 210 provided as input to the DAC.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processor device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:
1. A device comprising:
a pilot tone generator configured to:
  combine a first pilot tone with a first frequency band of a digital data signal by modulating an amplitude of the first frequency band of the digital signal using the first pilot tone, and
  combine a second pilot tone with a second frequency band of the digital data signal by modulating an amplitude of the second frequency band of the digital signal using the second pilot tone,
thereby generating a modified digital data signal;
an electro-optic modulator (EOM) configured to generate an optical signal based on the modified digital data signal;
a pilot tone detector configured to:
  receive the optical signal;
  generate a detector digital signal based on the optical signal; and
  detect a first pilot tone power and a second pilot tone power based on the detector digital signal; and
a control unit configured to determine an IQ time skew between an in-phase component and a quadrature component of the optical signal based on a ratio between the first pilot tone power and second pilot tone power.

2. The device of claim 1,
further comprising a digital delay filter configured to:
receive the modified digital data signal;
set an IQ time skew bias based on control information from the control unit; and
apply the IQ time skew bias to the modified digital data signal,
wherein the control unit is further configured to:
generate the control information based on the IQ time skew; and
provide the control information to the digital delay filter.

3. The device of claim 2, wherein:
the first frequency band is a portion of digital signal spectrum above a predetermined frequency; and
the second frequency band is a portion of digital signal spectrum below the predetermined frequency.

4. The device of claim 2, wherein the control unit is further configured to perform IQ time-skew calibration by:
providing skew sweep control information to the digital delay filter such that the digital delay filter sets the IQ time-skew bias equal to each of a plurality of IQ time-skew bias values;
for each of the plurality of IQ time-skew bias values, calculating a respective power ratio between the first pilot tone power and second pilot tone power for the respective IQ time-skew bias value;
calculating the IQ time skew based on the plurality of IQ time-skew bias values and the respective plurality of power ratios; and
providing IQ skew calibration control information to the digital delay filter such that the digital delay filter sets the IQ skew bias to compensate for the IQ time skew.

5. The device of claim 4, wherein the control unit is further configured to perform conjugation calibration by:
determining a phase conjugation status of the optical signal based on:
the plurality of IQ time-skew bias values and the respective plurality of power ratios; and
phase bias information received from the EOM; and
compensating for the phase conjugation status by setting a bias point of the EOM or inverting a polarity of the modified digital data signal.

6. The device of claim 5, wherein the control unit is further configured to perform IQ time-skew calibration and conjugation calibration during a power-up phase of the device.

7. The device of claim 4, wherein calculating the IQ time skew based on the plurality of IQ time-skew bias values and the respective plurality of power ratios comprises:
calculating a linear interpolation of the plurality of IQ time-skew bias values and the respective plurality of power ratios;
identifying a balance point on the linear interpolation corresponding to a power ratio value of 1:1; and
setting the IQ time skew equal to an IQ time skew bias value corresponding to the balance point.

8. The device of claim 5, wherein determining a phase conjugation status of the optical signal comprises:
calculating a linear interpolation of the plurality of IQ time-skew bias values and the respective plurality of power ratios;
identifying a positive or negative sign of a slope of the linear interpolation; and
determining that the optical signal is conjugated based on the sign of the slope of the linear interpolation and the phase bias information.

9. The device of claim 4, wherein:
the first pilot tone has a modulation frequency that is different from a modulation frequency of the second pilot tone; and
the pilot tone generator is configured to modulate the power of the first frequency band with the first pilot tone while modulating the power of the second frequency band with the second pilot tone.

10. The device of claim 4, wherein:
the first pilot tone and second pilot tone are both a single pilot tone having a single pilot tone modulation frequency; and
the pilot tone generator is configured to alternate over time between:
modulating the power of the first frequency band with the single pilot tone; and
modulating the power of the second frequency band with the single pilot tone.

11. The device of claim 1, wherein the pilot tone generator is further configured to:
apply a fast Fourier transform to the digital data signal to generate a frequency-domain digital data signal;
apply a digital signal processing unit to the frequency-domain digital data signal to obtain the first frequency band signal in a frequency domain and the second frequency band signal in the frequency domain;
apply an inverse fast Fourier transform to the first frequency band signal in the frequency domain and the second frequency band signal in the frequency domain to obtain the first frequency band signal in a time domain and the second frequency band signal in the time domain;
wherein modulating the amplitude of the first frequency band signal using the first pilot tone is performed in the time domain; and
wherein modulating the amplitude of the second frequency band signal using the second pilot tone is performed in the time domain.

12. The device of claim 1, wherein modulating the amplitude of first frequency band signal and modulating the amplitude of the second frequency band signal is performed using a modulation index between 1% and 3%.

13. The device of claim 12, wherein the first pilot tone and second pilot tone each have a respective modulation frequency between 100 KHz and 100 MHz.

14. The device of claim 1, wherein the electro-optic modulator comprises a dual-polarization IQ Mach-Zehnder modulator.

15. A method, comprising:
combining a first pilot tone with a first frequency band of a digital data signal by modulating an amplitude of the first frequency band of the digital signal using the first pilot tone, and combining a second pilot tone with a second frequency band of the digital data signal by modulating an amplitude of the second frequency band of the digital signal using the second pilot tone, thereby generating a modified digital data signal;
generating an optical signal based on the modified digital data signal;
generating a detector digital signal based on the optical signal;
detecting a first pilot tone power and a second pilot tone power based on the detector digital signal; and
using a ratio between the first pilot tone power and second pilot tone power to determine an IQ time skew between an in-phase component and a quadrature component of the optical signal.

16. The method of claim 15, further comprising performing IQ time-skew calibration by:
setting an IQ time-skew bias equal to each of a plurality of IQ time-skew bias values;
for each of the plurality of IQ time-skew bias values:
applying the IQ time-skew bias to the digital data signal; and
calculating a respective power ratio between the first pilot tone power and second pilot tone power for the respective IQ time-skew bias value;
calculating the IQ time skew based on the plurality of IQ time-skew bias values and the respective plurality of power ratios; and
applying the IQ time skew bias to the digital data signal to compensate for the IQ time skew.

17. The method of claim 16, further comprising performing conjugation calibration by:
determining a phase conjugation status of the optical signal based on:
the plurality of IQ time-skew bias values and the respective plurality of power ratios; and
phase bias information of an optical modulator used to generate the optical signal; and
compensating for the phase conjugation status by setting a bias point of the optical modulator or inverting a polarity of the modified digital data signal.

18. The method of claim 17, wherein IQ time-skew calibration and conjugation detection are performed during a power-up phase.

19. The method of claim 16, wherein:
the first pilot tone has a modulation frequency that is different from a modulation frequency of the second pilot tone; and
the pilot tone generator is configured to modulate the power of the first frequency band with the first pilot tone while modulating the power of the second frequency band with the second pilot tone.

20. The method of claim 16, wherein:
the first pilot tone and second pilot tone are both a single pilot tone having a single pilot tone modulation frequency; and
the pilot tone generator is configured to alternate over time between:
modulating the power of the first frequency band with the single pilot tone; and
modulating the power of the second frequency band with the single pilot tone.

\* \* \* \* \*